US008874939B2

(12) United States Patent
Honda et al.

(10) Patent No.: US 8,874,939 B2
(45) Date of Patent: Oct. 28, 2014

(54) APPARATUS AND METHOD FOR CONTROLLING POWER CONSUMPTION USING PRINTER SETTINGS

(75) Inventors: Seiji Honda, Kanagawa (JP); Toshiharu Hayashida, Kanagawa (JP); Hirota Takahashi, Kanagawa (JP); Eiji Nakahashi, Kanagawa (JP); Kenji Kuroishi, Kanagawa (JP); Masayoshi Miki, Kanagawa (JP); Akiyoshi Osugi, Kanagawa (JP); Tetsuo Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 960 days.

(21) Appl. No.: 12/961,266

(22) Filed: Dec. 6, 2010

(65) Prior Publication Data

US 2011/0317200 A1    Dec. 29, 2011

(30) Foreign Application Priority Data

Jun. 23, 2010  (JP) ................. 2010-143033

(51) Int. Cl.
  G06F 1/32      (2006.01)
  G06F 9/00      (2006.01)
  B41J 2/435     (2006.01)
  B41J 29/38     (2006.01)
  G06F 3/12      (2006.01)

(52) U.S. Cl.
  CPC ............... *B41J 29/38* (2013.01); *G06F 3/1221* (2013.01); *Y02B 60/1271* (2013.01); *G06F 3/1253* (2013.01); *G06F 3/1285* (2013.01)
  USPC ............................ 713/300; 713/100; 347/224

(58) Field of Classification Search
  None
  See application file for complete search history.

(56) References Cited

U.S. PATENT DOCUMENTS

| 2002/0144162 A1* | 10/2002 | Tada et al. ............ 713/300 |
| 2004/0246512 A1* | 12/2004 | Miyamoto ............. 358/1.13 |
| 2009/0070604 A1* | 3/2009 | Kumakura ............. 713/310 |
| 2009/0077399 A1* | 3/2009 | Noda et al. ............ 713/320 |
| 2010/0153545 A1* | 6/2010 | Mizuno ................. 709/224 |
| 2010/0174935 A1* | 7/2010 | Kim et al. ............. 713/324 |

FOREIGN PATENT DOCUMENTS

| CN | 1919604 A | 2/2007 |
| CN | 101387855 A | 3/2009 |
| JP | 2007-048219 A | 2/2007 |
| JP | 3944088 B2 | 7/2007 |
| JP | 2002-2297715 A | 10/2011 |
| WO | 03/069889 A1 | 8/2003 |

OTHER PUBLICATIONS

Japanese Office Action issued in counterpart Japanese Patent Application No. 2010-143033 dated Feb. 18, 2014.
Chinese Office Action issued in counterpart Chinese Patent Application No. 201010579059.2 dated Mar. 12, 2014.

* cited by examiner

*Primary Examiner* — Ji H Bae
(74) *Attorney, Agent, or Firm* — Sughrue Mion, PLLC

(57) ABSTRACT

The present invention provides an information processing apparatus including: a first control section that, when execution of printing at a printing device connected via a communications section is instructed, performs control to display at a display section a print settings screen for making settings relating to the printing; a calculation section that calculates an estimated value of power consumption that the printing device will consume if the printing is executed on the basis of the settings relating to printing; and a second control section that, when a pre-specified operation is performed at the print settings screen, performs control to display the estimated value of power consumption and display at the display section an energy saving settings screen for making, of the settings relating to printing, settings relating to energy saving.

11 Claims, 9 Drawing Sheets

APPARATUS AND METHOD FOR CONTROLLING POWER CONSUMPTION USING PRINTER SETTINGS

CROSS-REFERENCE TO RELATED APPLICATION

This application is based on and claims priority under 35 USC 119 from Japanese Patent Application No. 2010-143033 filed Jun. 23, 2010.

BACKGROUND

Technical Field

The present invention relates to an information processing apparatus, an information processing method, and a computer readable medium storing an information processing program.

SUMMARY

According to a first aspect of the invention, there is provided an information processing apparatus including: a first control section that, when execution of printing at a printing device connected via a communications section is instructed, performs control to display at a display section a print settings screen for making settings relating to the printing; a calculation section that calculates an estimated value of power consumption that the printing device will consume if the printing is executed on the basis of the settings relating to printing; and a second control section that, when a pre-specified operation is performed at the print settings screen, performs control to display the estimated value of power consumption and display at the display section an energy saving settings screen for making, of the settings relating to printing, settings relating to energy saving.

BRIEF DESCRIPTION OF THE DRAWINGS

Exemplary embodiments of the present invention will be described in detail based on the following figures, wherein.

DETAILED DESCRIPTION

Figure 1:
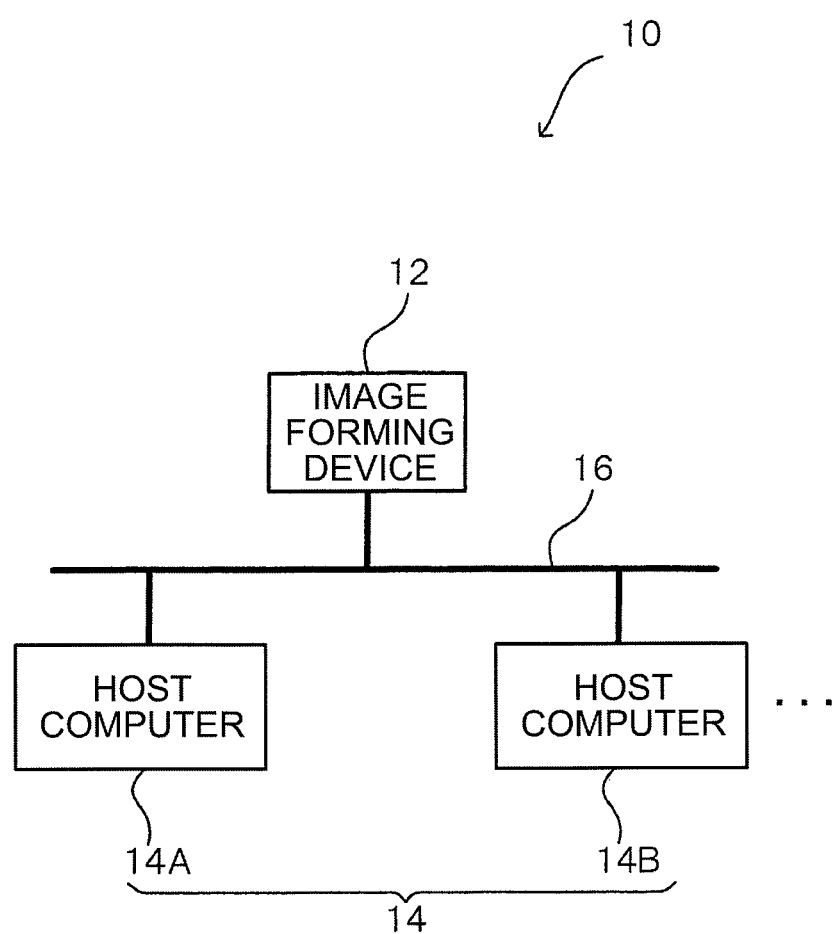
FIG. 1 is a schematic structural diagram of an image forming system of an exemplary embodiment.

Herebelow, an example of an exemplary embodiment of the present invention will be described in detail with reference to the drawings. FIG. 1 is a diagram illustrating schematic structure of an image forming system 10 including an image forming device 12 relating to the exemplary embodiment of the present invention.

In the image forming system 10, the image forming device 12 and plural host computers 14 (14A, 14B, . . . ) are connected to one another via a network 16.

Figure 2:
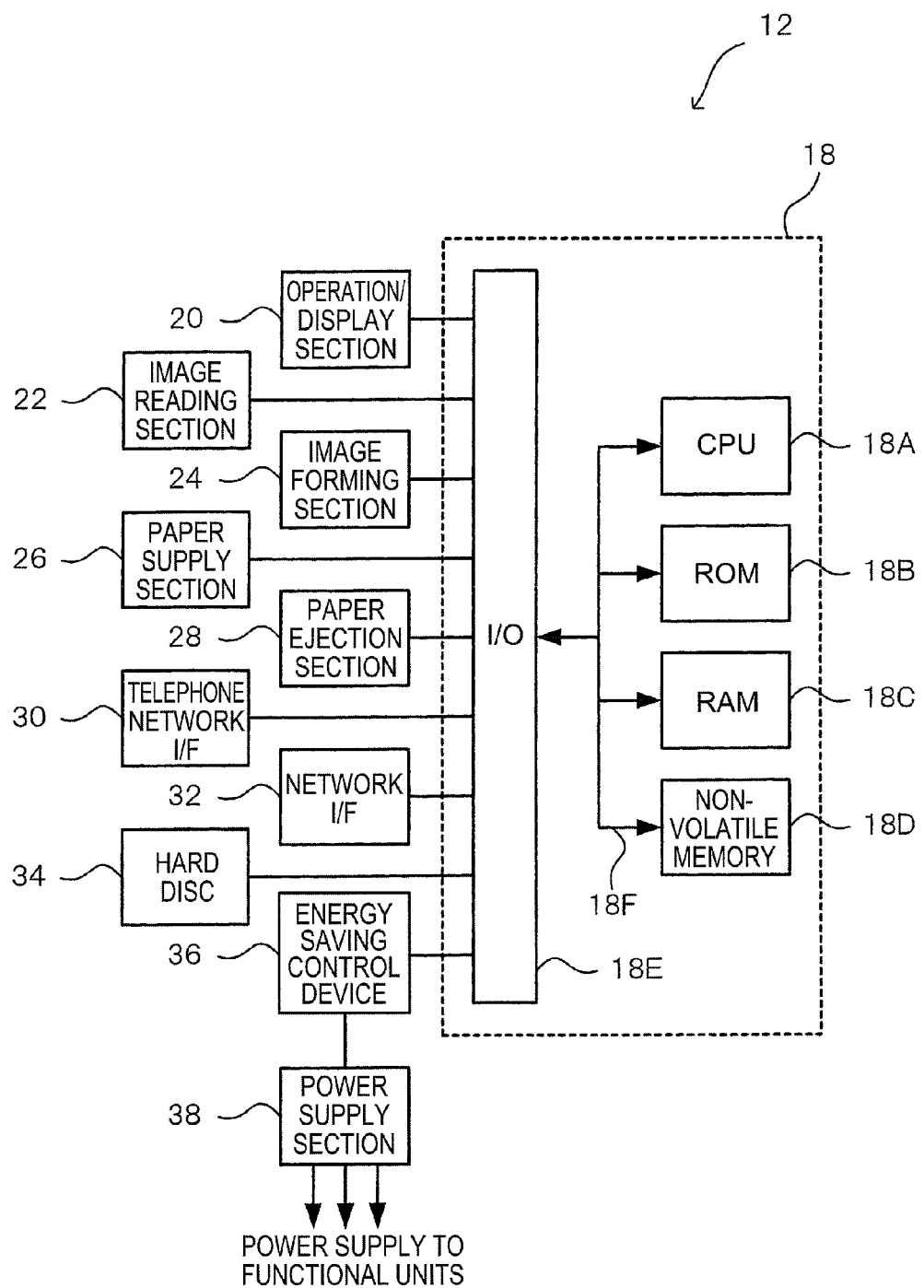
FIG. 2 is a schematic block diagram of an image forming device of the exemplary embodiment.

FIG. 2 is a diagram illustrating schematic structure of the image forming device 12 relating to the exemplary embodiment of the present invention. As illustrated in FIG. 2, the image forming device 12 is configured to include a main controller 18.

The main controller 18 is configured by a CPU (central processing unit) 18A, a ROM (read-only memory) 18B, a RAM (random access memory) 18C, a non-volatile memory 18D and an input/output interface (I/O) 18E being respectively connected via a bus 18F.

The I/O 18E is connected to functional units such as an operation/display section 20, an image reading section 22, an image forming section 24, a paper supply section 26, a paper ejection section 28, a telephone network interface (I/F) 30, a network interface (I/F) 32, a hard disc 34, and an energy saving control device 36.

The operation/display section 20 is configured to include, for example, various buttons and a touch panel or the like. The various buttons include a start button for instructing the start of copying and the like, and a ten-key pad and the like. The touch panel displays various screens, such as a settings screen, states of the device and the like. The settings screen is for setting details of processing such as image forming conditions, which are a copying density and the like.

The image reading section 22 is configured to include an image reading sensor such as a line CCD or the like, a scanning mechanism for scanning the image reading sensor, and a movement mechanism for moving an original document to a reading position, or the like. The image reading section 22 reads images of original documents that are placed on the device. Reading of original documents by the image reading section 22 includes automatic reading, in which an original document is moved to the reading position by the movement mechanism and read automatically, and manual reading, in which a user places an original document at an original reading position and the original document is read.

The image forming section 24 forms an image on a recording medium by, for example, an electro-photography system. Specifically, the image forming section 24 is configured to include a charging device, an exposure device, a developing device, a transfer device and a fixing device, or the like. The charging device charges up a photoreceptor drum. The exposure device forms an electrostatic latent image according to an image on the photoreceptor drum by exposing light onto the charged photoreceptor drum in accordance with the image. The developing device develops the electrostatic latent image formed on the photoreceptor drum with a toner. The transfer device transfers the toner image according to the image that has been formed on the photoreceptor drum onto the recording medium. The fixing device fixes the transferred toner image to the recording medium.

The exposure device is configured to include an optical scanning device, which is configured to include a semiconductor laser, a rotating polygon mirror and an optical system of a collimator lens, a cylindrical lens and an f-θ lens, or suchlike, or an LED head formed with plural LEDs, or the like.

The image forming section 24 is not limited to an electro-photography system. The image forming section that is employed may form images on recording mediums with an inkjet recording system.

The paper supply section 26 is configured to include a paper accommodation section in which recording paper is accommodated and a supply mechanism that supplies recording paper from the paper accommodation section to the image forming section 24, or the like. The image forming device 12 is provided with plural paper accommodation sections for accommodating recording papers of different types, and the supply mechanism is plurally provided in correspondence with the paper accommodation sections.

The paper ejection section 28 is configured to include a finisher, an ejection section and an ejection mechanism, or the like. The finisher applies post-processing such as stapling, hole-punching or the like to the recording paper. The recording paper is ejected to the ejection section, and the ejection mechanism ejects the recording paper on which an image has been formed by the image forming section 24 to the finisher or onto the ejection section.

The telephone network I/F 30 is an interface for implementing facsimile communications with another image forming device connected via the telephone network.

The network I/F 32 is an interface for implementing data communications with other devices, such as the host computers 14 and the like, via the network 16.

The hard disc 34 stores, for example, log data of states of the sections of the device, operating states and the like, log data of processing results of copies, facsimile communications, prints and the like, various kinds of settings data, a control program and so forth.

The energy saving control device 36 controls a power supply section 38 in accordance with details of processing whose execution is instructed by the operation/display section 20, and controls power to be supplied to functional units required for executing the instructed processing.

In accordance with control by the energy saving control device 36, the power supply section 38 turns ON and OFF supplies of power to functional units, such as the main controller 18, the operation/display section 20, the image reading section 22, the supply mechanism of the paper supply section 26, the ejection mechanism of the paper ejection section 28, the finisher and ejection mechanism of the paper ejection section 28, and the like.

That is, in the image forming device 12 of the present exemplary embodiment, the energy saving control device 36 controls the power supply section 38 so as to supply power only to the required functional units, and saves electricity to unnecessary functional units. For example, for print processing in the image forming device 12 of the present exemplary embodiment, a supply of power to the image reading section 22 is not necessary, and power of a corresponding amount is saved. When the image forming device 12 of the present exemplary embodiment is performing copying too, if, for example, the image forming device 12 switches to copying operations after the start of copying is instructed by an operation from the operation/display section 20, display at the operation/display section 20 and the like is suspended.

Thus, depending on types of image formation processing, it is not necessary to supply power to all functional units.

The image forming device 12 relating to the present exemplary embodiment controls power to be supplied to functional units and saves energy in portions. Therefore, the image forming device 12 varies in power consumption depending on types of processing content—copying, scanning, faxing or the like- settings of processing details and the like (for example, in regard to N-up printing in which N sheets of the original (N being two or more) are printed together on one sheet of paper, two-sided printing and the like: the number of recording papers to be ejected, the number of copies and so forth). For example, if printing processing is executed in accordance with a printing instruction from the host computer 14, power consumption is smaller in the latter case of one sheet of the original being printed on each sheet of paper and two sheets of the original being printed 2-up on each sheet of paper. Similarly, power consumption is smaller in the latter case of forming color images and forming black and white images.

Accordingly, in the present exemplary embodiment, when printing at the image forming device 12 is being instructed from the host computer 14, an energy saving settings screen for making printing settings that relate to energy saving is displayed. The image forming device 12 calculates and displays estimated values of power consumption in accordance with settings in the energy saving settings screen.

Figure 3:
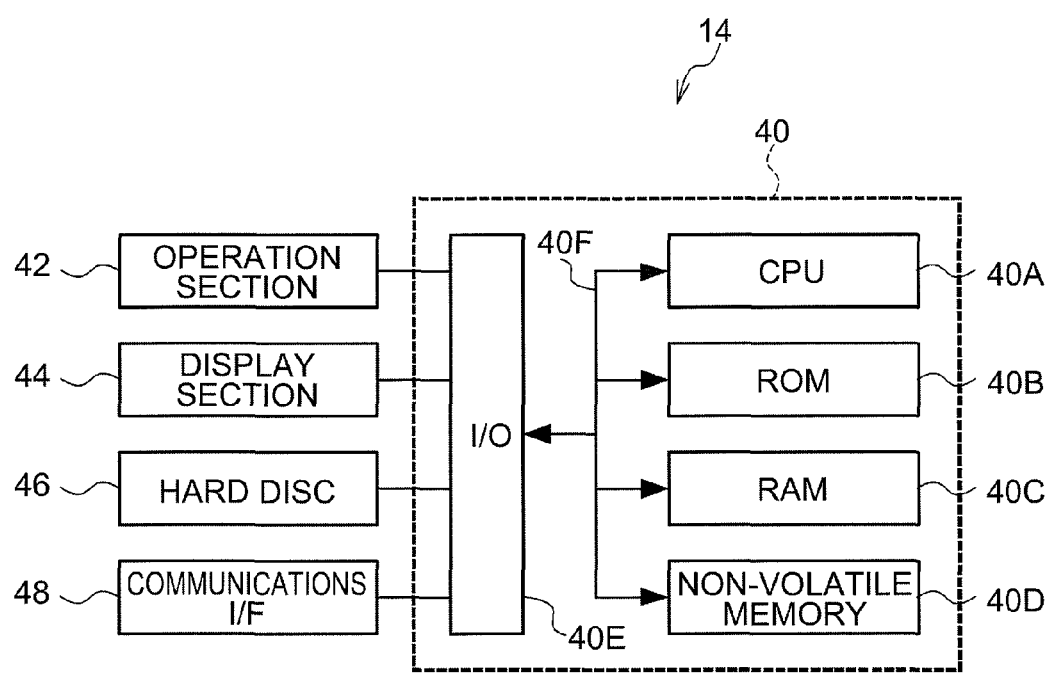
FIG. 3 is a schematic block diagram of a host computer of the exemplary embodiment.

FIG. 3 illustrates schematic structure of the host computer 14. The host computer 14 has the constitution of an ordinary computer, and is configured to include a controller 40.

The controller 40 has a structure in which a CPU (central processing unit) 40A, a ROM (read-only memory) 40B, a RAM (random access memory) 40C, a non-volatile memory 40D and an input/output interface (I/O) 40E are respectively connected via a bus 40F.

The I/O 40E is connected to an operation section 42, a display section 44, a hard disc 46 and a communications interface (I/F) 48 for communicating with other devices such as the image forming device 12 and the like via the network 16.

At the hard disc 46, a printing control program (a printer driver), a power consumption conversion table and various application software programs are memorized in advance. The printing control program (printer driver) displays a print settings screen, for printing instructions to the image forming device 12 and print settings, at the display section 44, and sends print settings parameters and print data specified in the print settings screen to the image forming device 12. The CPU 40A loads and executes the printing control program, for example, when a printing instruction is given during execution of an application program. The printing control program may be provided from a recording medium such as a CD-ROM or the like.

In the present exemplary embodiment, the power consumption conversion table is memorized in advance in the hard disc 46 in order to estimate power consumption of the image forming device 12 when printing with details specified by users. For each of the various print settings parameters, this power consumption conversion table stores power consumption values (for example, power consumption values for printing one sheet) in printing processing with the print setting parameters.

The print settings parameters include, for example, a two-sided setting (two-sided or one-sided), paper size (A3, A4, . . . ), N-up printing (outputting 2, 4, . . . , N sheets of an original on one sheet of paper or the like), an ejection section setting (to ejection section 1, ejection section 2, . . . ), a number of copies (1 to N), and the like. However, print settings parameters are not to be limited to these. The estimated values of power consumption are calculated by pre-specified calculation equations, with parameters including, for example, the power consumption values for the print settings parameters, the number of sheets in the original of print data, and the like.

The power consumption conversion table is, for example, installed together with the printing control program when the printing control program is installed on the hard disc 46.

Depending on configurations of the image forming device 12, print settings parameters may be different and the power consumption conversion table may also be different. For example, print settings parameters will be different and the power consumption conversion table will be different between a device with a finisher, which performs post-processing such as, for example, stitching printed papers, and a device without a finisher. In this case, the host computer 14 may rewrite the power consumption conversion table in accordance with configuration information of the image forming device 12 that is, for example, obtained separately from the printing control program when the printing control program is installed or the like. For example, the host computer 14 stores in advance a power consumption conversion table that stores power consumption values corresponding to all functions of the image forming device, removes print settings parameters from this power consumption conversion table in accordance with the separately acquired configuration information of the image forming device, and creates a new power consumption conversion table. Thus, the host computer 14 obtains a power consumption conversion table for the image forming device corresponding to the installed printing control program.

The configuration of the image forming device 12 may also be altered after installation of the printing control program, and power consumption values may change with software upgrades of the image forming device 12. Accordingly, the host computer 14 sends a request to the image forming device 12, for example, once each time the host computer 14 is started up and acquires configuration information of the image forming device 12 that has been altered or upgraded. The host computer 14 may request and acquire configuration information from the image forming device 12, and update the power consumption conversion table in accordance therewith, each time print data is sent to the image forming device 12 at a time of printing. Thus, the host computer 14 may maintain the power consumption conversion table in an up-to-date condition without communicating with the image forming device 12 more than necessary.

Figure 4:
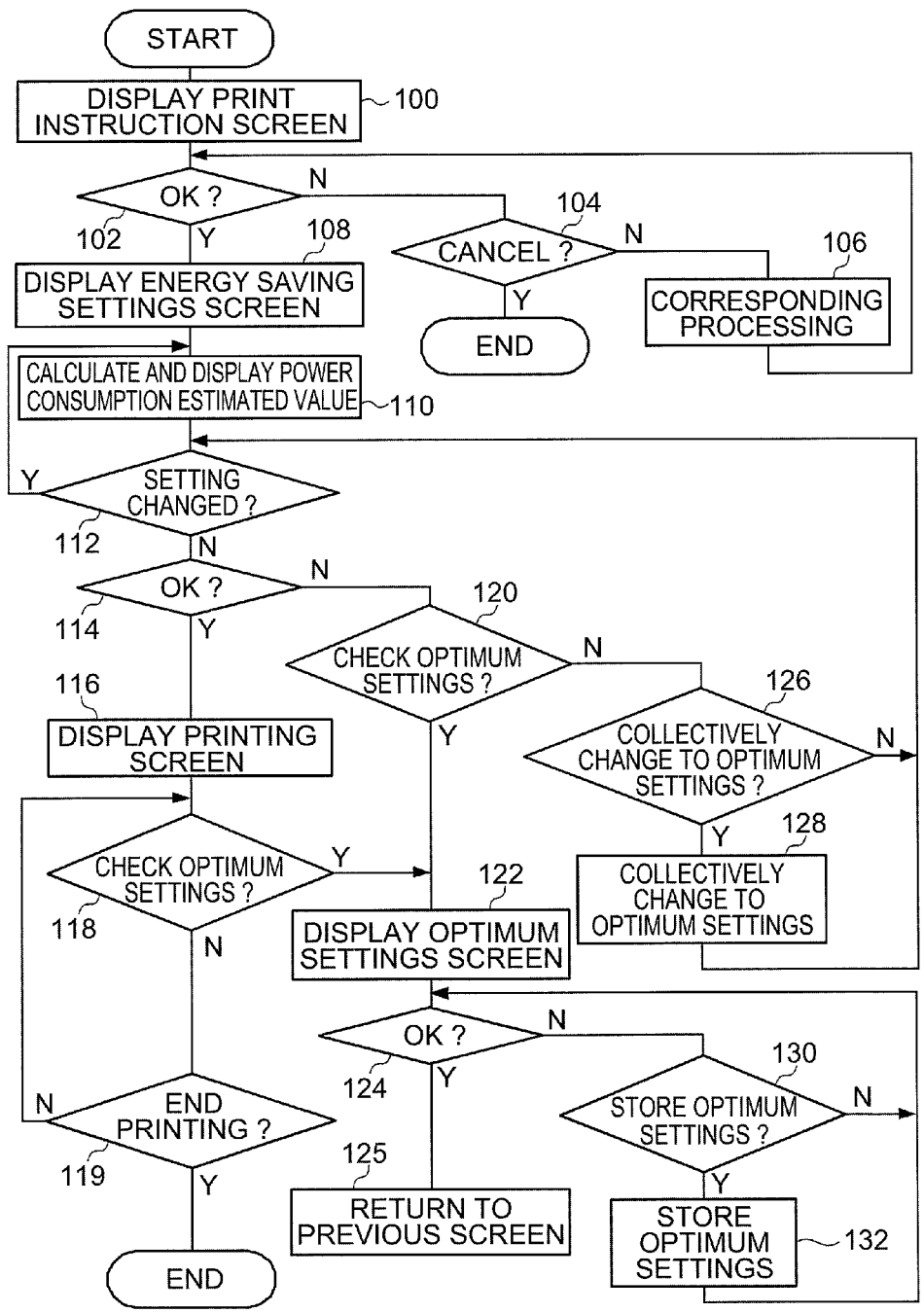
FIG. 4 is a flowchart of a printing control program executed by the host computer of the exemplary embodiment.

Next, as operations of the present exemplary embodiment, processing when the printing control program illustrated in FIG. 4 is executed at the CPU 40A of the host computer 14 is described.

The processing illustrated in FIG. 4 is executed consequent to the printing control program being read from the hard disc 46 when printing is instructed during execution of an application program at the host computer 14. Instructions for printing include an occasion when a shortcut icon for printing is clicked.

Figure 5:
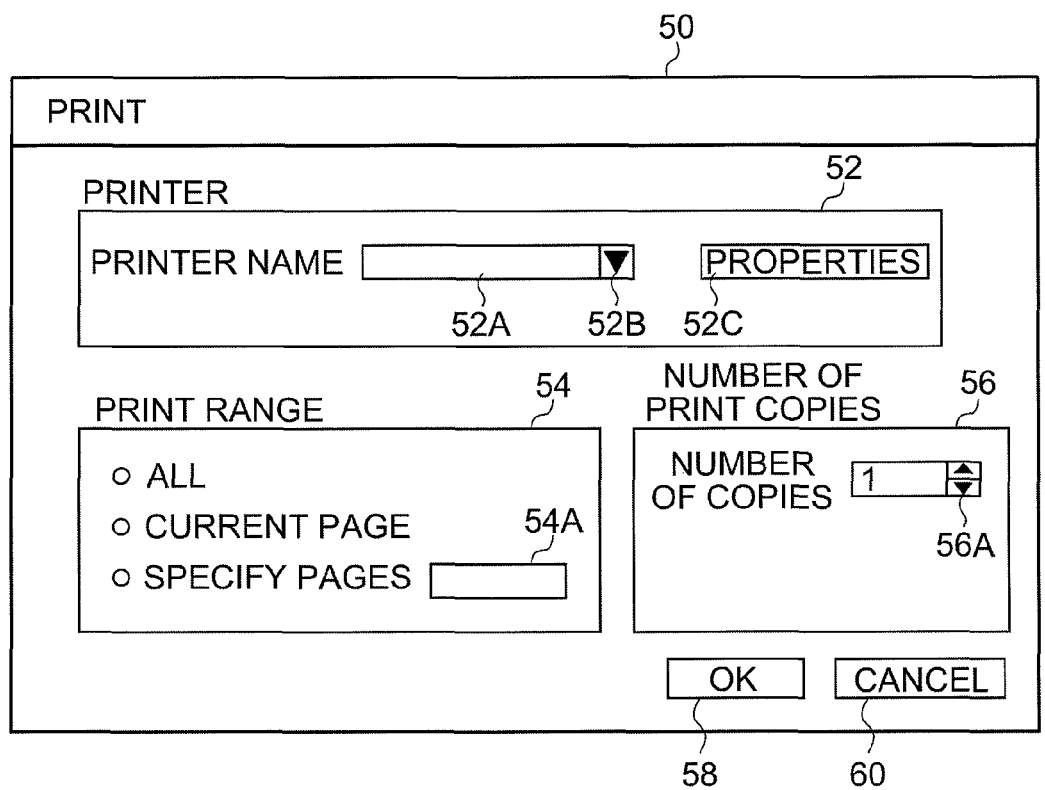
FIG. 5 is a diagram illustrating a print settings screen of the exemplary embodiment.

As illustrated in FIG. 4, in step 100, a print settings screen 50 as illustrated in FIG. 5 is displayed at the display section 44. The print settings screen 50 displays a printer setting area 52, a print range setting area 54 and a number of print copies setting area 56, or the like. At the lower right of the screen of the print settings screen 50, an OK button 58 and a Cancel button 60 are provided. The screen configuration of the print settings screen 50 is not to be limited by the above.

A printer name 52A is displayed in the printer setting area 52. Associated therewith, another printer may be selected by clicking on a pull-down button 52B in the printer setting area 52.

If a Properties button 52C is clicked on, a sub print settings screen (not illustrated) corresponding to functions of the selected printer is displayed, and more detailed settings may be made. In the sub print settings screen, print settings parameters such as, for example, color printing, black-and-white printing, N-up printing, two-sided printing and the like may be selected. When details of the respective print settings parameters are to be set, other sub print settings screens (not illustrated) may be displayed and print settings made in these screens. Thus, the print settings screen has a hierarchical structure.

In the print range setting area 54, one of the following may be selected: printing the whole of the original; printing only a currently displayed page; and specifying page numbers to be printed in a page number input area 54A and printing those pages.

In the number of print copies setting area 56, a number of copies to be printed may be increased or reduced by clicking on print copy number setting buttons 56A.

In step 102, it is determined whether or not the OK button 58 in the print settings screen 50 has been pressed. If the OK button 58 has been pressed, the process proceeds to step 108. On the other hand, if the OK button 58 has not been pressed, the process proceeds to step 104.

In step 104, it is determined whether or not the Cancel button 60 has been pressed. If the Cancel button 60 has been pressed, the present routine ends. On the other hand, if the Cancel button 60 has not been pressed, the process proceeds to step 106.

In step 106, corresponding processing for when the OK button 58 and the Cancel button 60 have not been pressed is executed. For example, if the Properties button 52C has been pressed, a sub print settings screen is displayed and further processing is executed in accordance with detailed settings by the user. If no button has been pressed, the process does nothing and returns to step 102.

Figure 6:
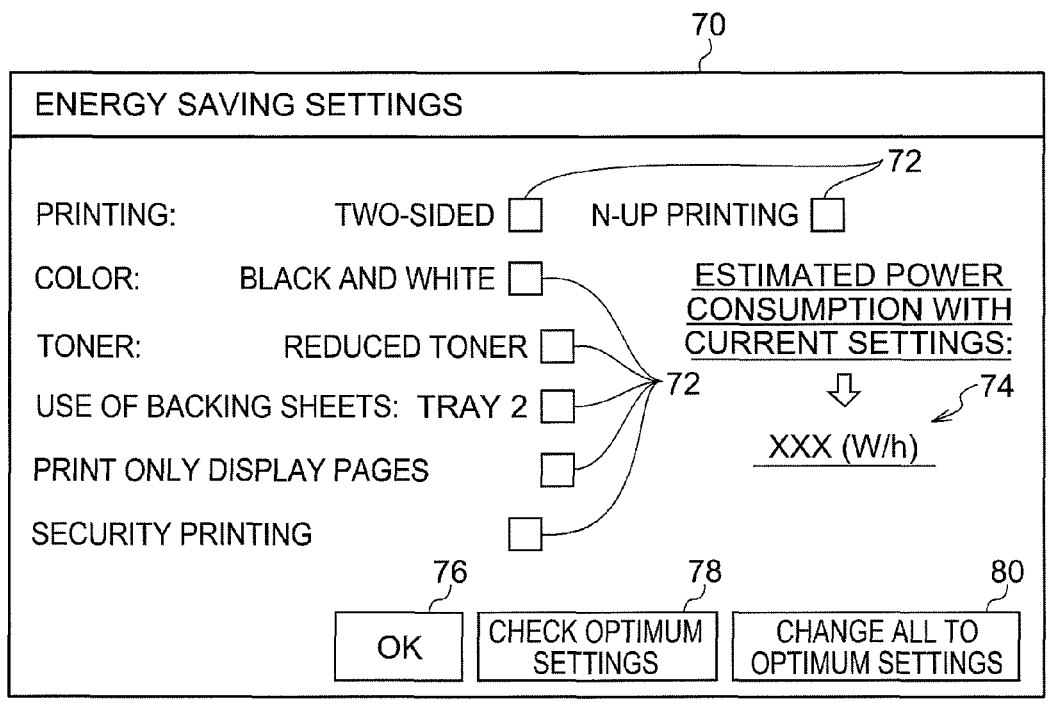
FIG. 6 is a diagram illustrating an energy saving settings screen of the exemplary embodiment.

When the OK button 58 is pressed, in step 108, an energy saving settings screen 70 as illustrated in FIG. 6 is displayed as a pop-up, for example, below the print settings screen 50 or overlaying the print settings screen 50.

The energy saving settings screen 70 is a screen for making settings only of print settings parameters relating to energy saving and resource saving. In the energy saving settings screen 70 relating to the present exemplary embodiment, two-sided printing, N-up printing, black and white printing, reduced toner printing, printing using backing sheets, printing only of display pages, and security printing (a function in which image data is sent to the image forming device 12 but printing is executed only with input by the user of a secret number at the image forming device 12) are given as examples of print settings parameters relating to energy saving and resource saving. However, the energy saving settings screen 70 is not to be limited by the above. The print settings parameters relating to energy saving and resource saving that can be set in the energy saving settings screen 70 may be further provided with customization functions for free selection by the user.

In the energy saving settings screen 70, when a user checks checkboxes 72 just to the right of the print settings parameters, the checkboxes are, for example, shaded black and the print settings parameters are set.

An estimated value of power consumption 74 for the current settings is displayed in the energy saving settings screen 70. An OK button 76, a Check Optimum Settings button 78 and a Change All button 80, which is for collectively changing the settings to optimum settings, are also displayed at the energy saving settings screen 70.

In step 110, an estimated value of power consumption for the current print settings is calculated. That is, the host computer 14 acquires the power consumption values of print settings parameters for the current print settings parameters from the power consumption conversion table stored in the hard disc 46. Then, the host computer 14 calculates the estimated value of power consumption by substituting the acquired power consumption values into the pre-specified calculation equation in order to perform the calculation. The host computer 14 displays the calculated estimated value of power consumption 74 as illustrated in FIG. 6.

In step 112, it is determined whether or not settings have been changed by any of the checkboxes 72 in the energy saving settings screen 70 being checked. If a setting has been changed, the process returns to step 110, an estimated value of power consumption for the changed print settings is calculated in the same manner as above and is displayed at the display section 44.

If no settings have been changed, the process proceeds to step 114, and it is determined whether or not the OK button 76 has been pressed. If the OK button 76 has been pressed, the process proceeds to step 116. On the other hand, if the OK button 76 has not been pressed, the process proceeds to step 120.

Figure 7:
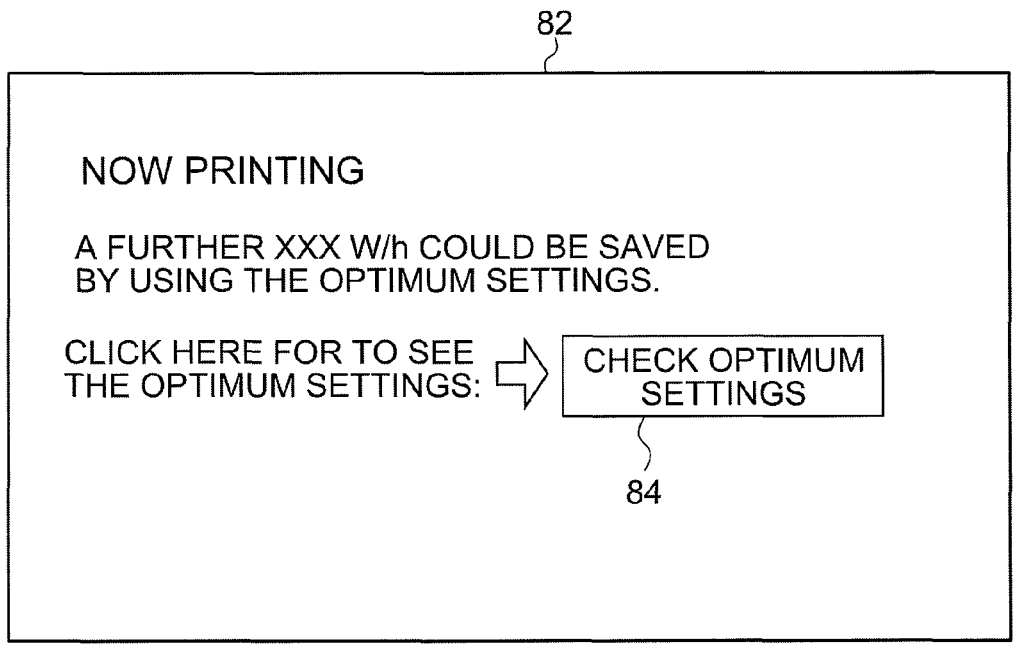
FIG. 7 is a diagram illustrating a printing screen of the exemplary embodiment.

In step 116, the specified print settings parameters and print data are sent to the image forming device 12 and printing is instructed. In addition, in step 116, a printing screen 82 as illustrated in FIG. 7 is displayed at the display section 44.

The printing screen 82 displays a message that printing is in progress and displays a value of power that could be saved if printing were done with more optimum settings. The value of power that could be saved is found by, for example, calculating an estimated value of power consumption for optimum settings, which are specified beforehand, by the same method as in step 110 and calculating the difference from the estimated value of power consumption calculated in step 110.

An Optimum Print Settings button 84 is displayed in the printing screen 82. In step 118, if this Optimum Print Settings button 84 has been pressed, the process proceeds to step 122, and if the Optimum Print Settings button 84 has not been pressed, the process proceeds to step 119.

In step 119, the host computer 14 determines whether or not printing has finished. That is, the host computer 14 determines whether or not it has been reported from the image forming device 12 that printing has finished. If printing has finished, the present routine ends. On the other hand, if printing has not finished, the process returns to step 118.

If it is determined in step 114 that the OK button 76 has not been pressed, then in step 120, it is determined whether or not the Check Optimum Settings button 78 has been pressed. If the Check Optimum Settings button 78 has been pressed, the process proceeds to step 122. On the other hand, if the Check Optimum Settings button 78 has not been pressed, the process proceeds to step 126.

Figure 8:
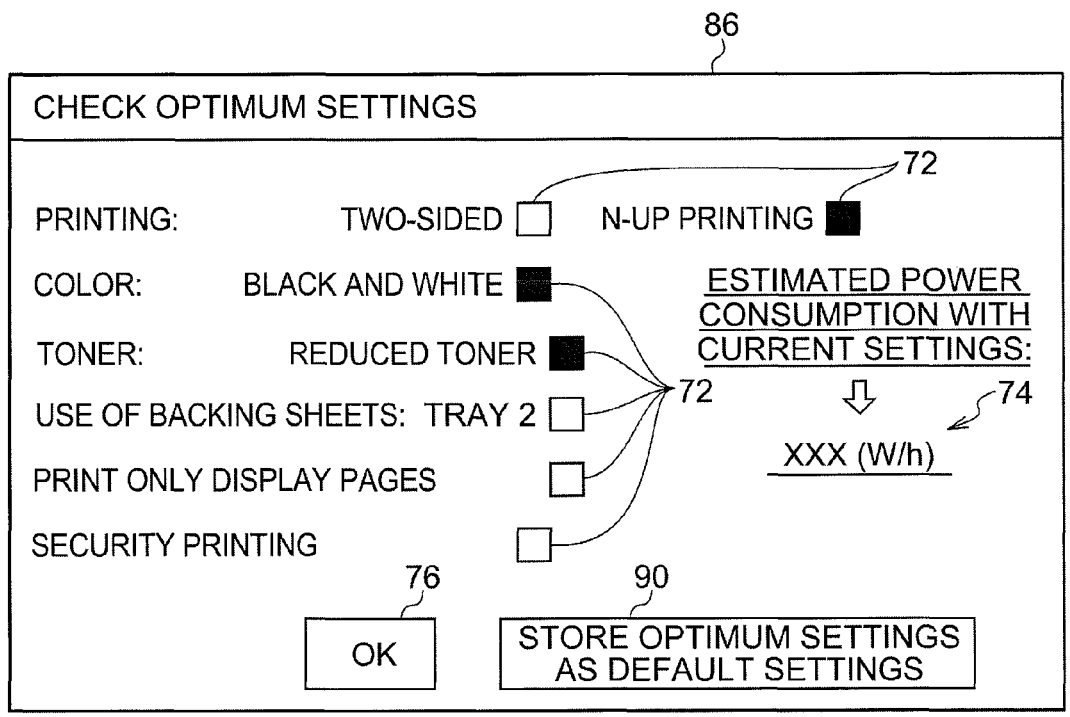
FIG. 8 is a diagram illustrating an optimum settings checking screen of the exemplary embodiment.

In step 122, an optimum print settings screen 86 is displayed in the display section 44 as illustrated in FIG. 8. The optimum print settings screen 86 is a screen in which the checkboxes 72 of print setting parameters corresponding to the pre-specified optimum settings are checked.

The optimum settings are settings with which power consumption is lower than when the image forming device 12 executes printing in accordance with pre-specified standard settings. The standard settings are settings for when, for example, faithfully reproducing the originals is given priority over energy saving. Namely, the standard settings are settings that are employed when the user instructs printing without specifically changing the settings.

In FIG. 8, the energy saving parameters of the checkboxes 72 that are, as an example, filled with black are the optimum settings.

In the optimum print settings screen 86, the OK button 76 and a Save button 90 for saving the optimum settings as default settings are displayed.

In step 124, it is determined whether or not the OK button 76 has been pressed. If the OK button 76 has been pressed, the process proceeds to step 125. On the other hand, if the OK button 76 has not been pressed, the process proceeds to step 130. In step 125, the host computer 14 returns to the previous screen. Namely, if the process has proceeded through steps 120, 122 and 124 due to the Check Optimum Settings button 78 in the energy saving settings screen 70 being pressed, the process returns to step 108 and the energy saving settings screen 70 is displayed. On the other hand, if the process has proceeded through steps 118, 122 and 124 due to the Optimum Print Settings button 84 in the printing screen 82 being pressed, the process returns to step 116 and the printing screen 82 is displayed.

In step 130, it is determined whether or not the Save button 90 has been pressed. If the Save button 90 has been pressed, the process proceeds to step 132. On the other hand, if the Save button 90 has not been pressed, the process proceeds to step 124.

In step 132, the optimum settings are stored in the hard disc 46 as default values of the print settings. Hence, from the next time the printing control program is executed, the optimum settings are set as default settings.

If it is determined in step 120 that the Check Optimum Settings button 78 has not been pressed, the process proceeds to step 126 and it is determined whether or not the Change All button 80 has been pressed. If the Change All button 80 has been pressed, the process proceeds to step 128. On the other hand, if the Change All button 80 has not been pressed, the process proceeds to step 112.

In step 128, the print settings parameters are collectively changed to the pre-specified optimum settings, and the process proceeds to step 112. In step 112, it is determined that the settings have changed, and the estimated value of power consumption for the optimum settings is calculated in step 110 and displayed.

Thus, in the present exemplary embodiment, when printing is instructed, the host computer 14 displays the energy saving settings screen 70 for setting only print setting parameters that relate to energy saving and resource saving, and each time a setting is changed, updates the estimated value of power consumption.

For the present exemplary embodiment, a case has been described in which, when the OK button 58 in the print settings screen 50 illustrated in FIG. 5 is pressed, the energy saving settings screen 70 as illustrated in FIG. 6 is displayed as a pop-up. However, in an alternative exemplary embodiment, a dedicated button for displaying the energy saving settings screen 70 may be provided in the print settings screen 50 of FIG. 5 and the energy saving settings screen 70 displayed as a pop-up when this dedicated button is pressed.

In an alternative exemplary embodiment, if the image forming device 12 is, for example, a device that takes time for the fixing device to start up and takes time to recover from an energy saving mode to an ordinary mode, in step 100, the print settings screen 50 is displayed at the display section 44 and the host computer 14 sends a notification to the image forming device 12 to recover from the energy saving mode to the ordinary mode.

Figure 9:
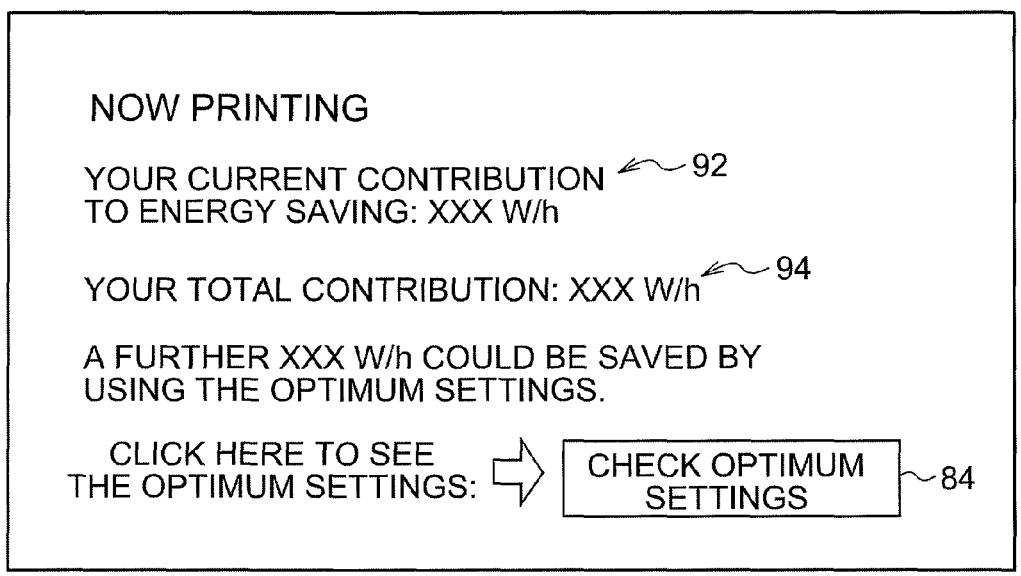
FIG. 9 is a diagram illustrating a printing screen of an alternative exemplary embodiment.

In an alternative exemplary embodiment, when the printing screen 82 is displayed in step 116, as illustrated in FIG. 9, an energy saving contribution 92 for the current print and a total contribution of the user 94 may be displayed. The energy saving contribution 92 is obtained by, for example, storing an estimated value of power consumption for the pre-specified standard print settings parameters in the hard disc 46 in advance, and calculating a difference between this and the estimated value of power consumption calculated in step 110.

In another exemplary embodiment, the energy saving contributions 92 calculated in the past for each user are stored in the hard disc 46 as the total contributions of users 94, and the total contribution of the user 94 for each user is found by adding the current energy saving contribution 92 to the total contribution of the user 94.

Further, in an alternative exemplary embodiment, the contribution is not displayed in units of power as illustrated in FIG. 9 but may be converted to be displayed so as to be easy to understand visually or sensorily, for example, as a picture of trees or the like, and displayed. For example, in another exemplary embodiment, if 10 Wh is one tree and the total contribution of the user 94 is 100 Wh, a picture of ten trees is displayed. In an alternative exemplary embodiment, the contribution may be converted to, for example, a number of sheets of A4 size paper and displayed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    at least one central processing unit (CPU) that is programmed to perform control to display at a display section a print settings screen for making settings relating to the printing in response to execution of printing at a printing device connected via a communications section being instructed,
    wherein the at least one CPU is programmed to calculate an estimated value of power consumption that the printing device will consume if the printing is executed using the settings relating to printing,
    wherein the at least one CPU is programmed to perform control to display the estimated value of power consumption and display at the display section an energy saving settings screen for making settings relating to energy saving in response to a pre-specified operation being performed at the print settings screen, and
    wherein the at least one CPU is programmed to perform control to display at the display section, as a conservable power, a difference between:
        an estimated value of power consumption for, from among the settings relating to energy saving, pre-specified energy saving settings with which power consumption is lower than if printing is executed using pre-specified standard settings, and
        the estimated value of power consumption if the printing is executed using current settings.

2. The information processing apparatus according to claim 1, wherein the at least one CPU is programmed to, each time the settings relating to energy saving are changed, calculate an estimated value of power consumption that the printing device will consume if the printing device executes the printing using the changed settings relating to energy saving, and
    wherein the at least one CPU is programmed to perform control to display the estimated value of power consumption at the display section.

3. The information processing apparatus according to claim 1, wherein the at least one CPU is programmed to perform control to display at the display section an energy saving settings checking screen for checking, from among the settings relating to energy saving, the pre-specified energy saving settings with which power consumption is lower than if printing is executed using the pre-specified standard settings.

4. The information processing apparatus according to claim 1, wherein the at least one CPU is programmed to change to, from among the settings relating to energy saving, the pre-specified energy saving settings with which power consumption is lower than if printing is executed using the pre-specified standard settings.

5. The information processing apparatus according to claim 1, wherein the at least one CPU is programmed to set, from among the settings relating to energy saving, the pre-specified energy saving settings with which power consumption is lower than if printing is executed using the pre-specified standard settings, as default values.

6. An information processing apparatus comprising:
    at least one central processing unit (CPU) that is programmed to perform control to display at a display section a print settings screen for making settings relating to the printing, in response to execution of printing at a printing device connected via a communications section being instructed,
    wherein the at least one CPU is programmed to calculate an estimated value of power consumption that the printing device will consume if the printing is executed using the settings related to printing,
    wherein the at least one CPU is programmed to perform control to display the estimated value of power consumption and display at the display section an energy savings settings screen for making settings relating to energy saving in response to a pre-specified operation being performed at the print settings screen, and
    wherein the at least one CPU is programmed to perform control to display at the display section, as an energy saving contribution, a difference between an estimated value of power consumption if the printing is executed using pre-specified standard settings, and the estimated value of power consumption if the printing is executed using current settings.

7. The information processing apparatus according to claim 6, further comprising a storage programmed to store a total value totaling a plurality of the energy saving contributions,
    wherein the at least one CPU is programmed to perform control to display the total value of the energy saving contributions at the display section.

8. The information processing apparatus according to claim 7, wherein the at least one CPU is programmed to perform control to convert at least one of the energy saving contributions to a graphic corresponding to a magnitude of power consumption, and is programmed to display the graphic at the display section.

9. The information processing apparatus according to claim 1, wherein the at least one CPU is programmed to notify the printing device to prepare for printing processing, in response to the energy saving settings screen being displayed at the display section.

10. A method of processing information at an information processing apparatus including a printing device that is connected via a communications section and executes printing, a display section, a first control section that controls the display section, a calculation section that calculates estimated values of power consumption, and a second control section that controls the display section, the method comprising:
  controlling to display a print settings screen for making settings relating to printing at the display section;
  calculating an estimated value of power consumption that the printing device will consume if the printing device executes printing using the settings relating to printing;
  when a pre-specified operation is performed at the print settings screen, displaying the estimated value of power consumption;
  controlling to display at the display section an energy saving settings screen for making, from among the settings relating to printing, settings relating to energy saving; and
  instructing the printing device, via the communications section, to execute printing using the settings relating to printing and the settings relating to energy saving,
  wherein the method further comprises:
    displaying at the display section, as a conservable power, a difference between:
      an estimated value of power consumption for, from among the settings relating to energy saving, pre-specified energy saving settings with which power consumption is lower than if printing is executed using pre-specified standard settings, and
      the estimated value of power consumption if the printing is executed using current settings.

11. A non-transitory computer readable medium storing a program causing a computer to execute a process for information processing, the computer including a printing device that is connected via a communications section and executes printing, a display section, a first control section that controls the display section, a calculation section that calculates estimated values of power consumption, and a second control section that controls the display section, and the process comprising:
  controlling to display a print settings screen for making settings relating to printing at the display section;
  calculating an estimated value of power consumption that the printing device will consume if the printing device executes printing using the settings relating to printing;
  when a pre-specified operation is performed at the print settings screen, displaying the estimated value of power consumption;
  controlling to display at the display section an energy saving settings for making, from among the settings relating to printing, settings relating to energy saving; and
  instructing the printing device, via the communications section, to execute printing using the settings relating to printing and the settings relating to energy saving,
  wherein the process further comprises:
    displaying at the display section, as a conservable power, a difference between:
      an estimated value of power consumption for, from among the settings relating to energy saving, pre-specified energy saving settings with which power consumption is lower than if printing is executed using pre-specified standard settings, and
      the estimated value of power consumption if the printing is executed using current settings.

* * * * *